United States Patent [19]

Hayner

[11] 3,771,563
[45] Nov. 13, 1973

[54] LOW FRICTION PRESSURE REGULATING VALVE
[75] Inventor: Paul F. Hayner, Lexington, Mass.
[73] Assignee: Sanders Associates, Inc., Nashua, N.H.
[22] Filed: May 15, 1972
[21] Appl. No.: 253,088

[52] U.S. Cl...... 137/625.28, 137/625.3, 251/DIG. 2
[51] Int. Cl............................................... F16k 7/18
[58] Field of Search ............................... 251/DIG. 2; 137/625.3, 625.28

[56] References Cited
UNITED STATES PATENTS
1,138,994  5/1915  Steele .......................... 137/625.3 X
19,203  1/1858  Osgood .......................... 251/DIG. 2
3,690,344  9/1972  Brumm .......................... 137/625.28

FOREIGN PATENTS OR APPLICATIONS
983  1854  Great Britain ................. 251/DIG. 2

Primary Examiner—Arnold Rosenthal
Attorney—Louis Etlinger

[57] ABSTRACT

A pressure regulating valve is described in which the element that variably occludes the outlet opening is a thin, flexible member which lies flat to cover the opening and which is rolled up to uncover it.

1 Claim, 2 Drawing Figures

Patented Nov. 13, 1973

3,771,563

3,771,563

LOW FRICTION PRESSURE REGULATING VALVE

FIELD OF THE INVENTION

This invention relates generally to pressure regulating valves and particularly to such valves which are suitable for reducing the pressure of gaseous fluids such as steam.

BACKGROUND OF THE INVENTION

Pressure regulating valves of various kinds are well known. All of them have one or more moveable elements which impede the flow of fluid by variably occluding one or more openings. Such elements have taken various forms, such as sliding flat plates or gates, plates or discs with apertures, hollow cylinders with apertures, plugs moveable within such cylinders, and many other forms. Most of these valves have exhibited excessive hysteresis in their operation, due largely to the inherent friction of the sliding parts. Such excessive hysteresis is always undesirable but is especially objectionable in those valves in which the flow or the output pressure is controlled automatically.

It is a general object of the present invention to provide an improved pressure regulating valve.

A more specific object is to provide a pressure regulating valve which operates with very little friction thereby minimizing the hysteresis.

SUMMARY OF THE INVENTION

Briefly stated, a valve incorporating the present invention employs a thin, flexible member which lies flat over an opening to close the valve. The valve is opened by partially rolling up the member to expose the opening.

BRIEF DESCRIPTION OF THE DRAWING

For a clearer understanding of the invention, reference may be made to the following detailed description and the accompanying drawing in which.

DESCRIPTION OF PREFERRED EMBODIMENT

Figure 1:
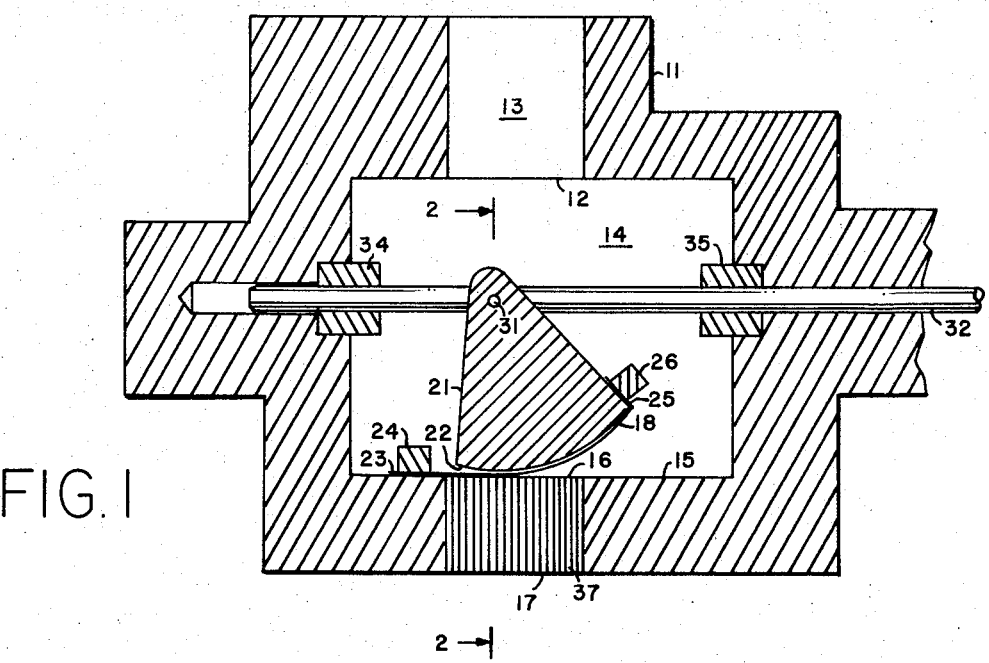
FIG. 1 is a schematic cross section view of a valve incorporating the invention.

Referring first to FIG. 1, there is shown a valve body 11 formed to define an inlet opening 12 which communicates with an inlet passageway 13 and with a chamber 14. The body 11 is also formed to define a generally planar surface 15 having an outlet opening 16 formed therein which communicates with the chamber 14 and with an outlet passageway 17.

A thin flexible member 18 is positioned and arranged to variably occlude the outlet opening 16 so as to open and close the valve. The member 18 should be flexible, impervious to the fluid with which the valve is to be used and not readily damaged by the fluid. For steam, a member 18 of berylium nickel may be used.

Within the chamber 14 is an element 21 formed with a curved surface 22 and mounted so that it may be moved with a rolling motion of its curved surface 22 over the opening 16 and the flat surface 15. The flexible member 18, which may be rectangular in shape, has one edge 23 fastened to the surface 15 adjacent to the opening 16 by any suitable arrangement such as a bar 24 which in turn may be bolted, welded, or otherwise secured to the valve body 11. The opposite edge 25 of the flexible member 18 is fastened to the element 21 in such a way that the portion of the member 18 between the edges 23 and 25 lies between the flat surface 15 and the curved surface 22. The element 21 is mounted so that as it rolls over the outlet opening 16 in one direction, to the right as illustrated in FIG. 1, the member 18 is unrolled from the curved surface 22 and pressed flat over the opening 16 and against the flat surface 15 surrounding the opening 16, while when the element 21 is rolled in the opposite direction, to the left as illustrated in FIG. 1, the member 18 is rolled up onto the curved surface 22, In FIG. 1, the member 18 is shown as if it were spaced from the curved surface 22. It is to be understood that it is shown this way only so that the member 18 and the surface 22 can be shown clearly and that actually the member 18 is in engagement with the surface 22. When the element 21 is approximately sectorial in cross section, as shown, the member 18 may be folded around the corner, as shown, and fastened to the flat portion by means of a bar 26 similar to the bar 24.

Figure 2:
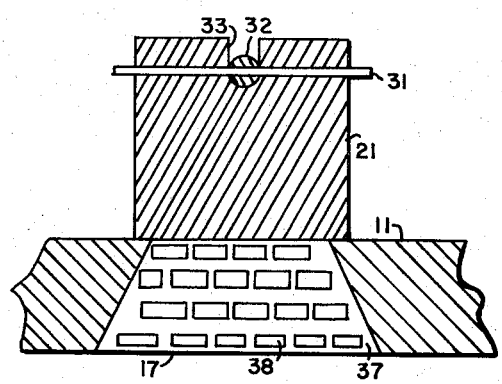
FIG. 2 is a cross section view taken on the line 2—2 of FIG. 1.

It is preferred, for simplicity, but not essential, that the surface 22 be a right cylindrical surface. In such case, the element 21 may be mounted by means of a pivot pin 31 through the element 21 and extending through an actuator such as a rod 32 passing through a recess 33 in the element 21 as shown in FIG. 2. If the pin 31 is on the cylindrical axis, the motion of the rod will be linear and it may be mounted in bushings 34 and 35 fastened to the valve body 11. (If a shorter throw is desired, the rod 32 may be mounted nearer to the surface 22 but then its motion will not be linear). The rod 32 may be operated either manually or automatically but it is thought at present that the invention will have its widest application in automatically operated valves.

It is preferred that the outlet passageway 17 be provided with apparatus for subdividing it into a number of smaller passageways. Such apparatus serves two purposes. First, it provides support for the member 18. Second, it makes the valve quieter in operation. For the second reason it is also preferred that the outlet passageway be tapered, as shown in FIG. 2, to form a passageway the cross section area of which increases in the direction of flow. The subdividing apparatus may, for example, be a plurality of small diameter tubes packed closely together but at present it is preferred to use a plurality of thin plates 37, each formed with many baffles 38, protruding from one face and in engagement with the next adjacent plate. Such plates may be similar to those described and claimed in the copending application of Paul F. Hayner and Richard J. Brockway, Ser. No. 93,192 filed Nov. 27, 1970 and entitled Fluid Flow Restrictor, now U.S. Pat. No. 3,688,800. The baffles 38 are preferably staggered, as shown in FIG. 2, so that the fluid, in passing between adjacent plates, is required to make many changes of direction so as to reduce its pressure without generating excessive noise.

In operation, the actuator 32 may be moved all the way to the right, thereby unrolling the member 18 from the surface 22 and completely covering the opening 16. In this position, the member 18 is held tightly over the opening 16 and against the surface 15 and the edges of the plates 37 by the pressure of the fluid in the chamber 14. In order to open the valve, the actuator 32 is moved to the left, thereby rolling the member 18 onto the surface 22. Spaces between the plates 37 are exposed one at a time. Since the member 18 rolls instead of sliding, there is very little friction and any particular setting can be obtained repeatedly with little error. Stated another way, there is very little hysteresis. Movement of the rod 32 all the way to the left opens the valve wide.

Although a preferred embodiment of the invention has been described in considerable detail for illustrative purposes, many modifications within the spirit of the invention will occur to those skilled in the art. It is therefore desired that the protection afforded by Letters Patent be limited only by the true scope of the appended claims.

What is claimed is:

1. A valve including a valve body formed to define an inlet opening, a generally planar surface having an outlet opening formed therein and a chamber between said openings, said valve also including a rigid element formed to define a portion of a cylindrical surface and mounted to move with a rolling motion of said cylindrical surface over said outlet opening, a flexible member having one portion fastened to said valve body adjacent to said outlet opening and another portion fastened to said rigid element, said element and said member being relatively positioned and mounted so as to be moveable from a first position, at which said member is rolled onto said cylindrical surface so as to uncover said outlet opening, to a second position, at which said member is unrolled from said element onto said generally planar surface so as to lie over and cover said outlet opening, and similarly moveable from said second position back to said first position, said valve also including an actuator mounted to be moveable with a substantially linear motion substantially parallel to said generally planar surface and pivotally mounted to said rigid element on the axis of said cylindrical surface whereby linear back and forth motion of said actuator moves said element between said first and second positions, said valve body also being formed to define an outlet passageway communicating with said outlet opening and tapered so as to increase in cross sectional area in the direction of fluid flow, and a plurality of thin plates disposed in said passageway and arranged with their planes parallel to the direction of fluid flow and each formed with a plurality of baffles protruding from one surface thereof and in engagement with the flat surface of an adjacent plate so as to subdivide said passageway into a plurality of smaller passageways.

* * * * *